United States Patent
Kirby

(10) Patent No.: US 10,288,527 B2
(45) Date of Patent: May 14, 2019

(54) PRESSURE SENSING APPARATUS

(71) Applicant: ROLLS-ROYCE PLC, London (GB)

(72) Inventor: Stuart James Kirby, Derby (GB)

(73) Assignee: ROLLS-ROYCE PLC, London (GB)

( * ) Notice: Subject to any disclaimer, the term of this patent is extended or adjusted under 35 U.S.C. 154(b) by 701 days.

(21) Appl. No.: 14/991,404

(22) Filed: Jan. 8, 2016

(65) Prior Publication Data

US 2016/0223419 A1    Aug. 4, 2016

(30) Foreign Application Priority Data

Feb. 3, 2015   (GB) .................................... 1501764.3

(51) Int. Cl.
| | |
|---|---|
| *G01L 11/04* | (2006.01) |
| *G01M 15/14* | (2006.01) |
| *F01D 17/08* | (2006.01) |
| *G01L 11/06* | (2006.01) |
| *F01D 25/32* | (2006.01) |

(52) U.S. Cl.
CPC .............. *G01M 15/14* (2013.01); *F01D 17/08* (2013.01); *F01D 25/32* (2013.01); *G01L 11/06* (2013.01); *F05D 2270/301* (2013.01); *F05D 2270/80* (2013.01)

(58) Field of Classification Search
CPC ...... F01D 25/32; F01D 17/08; F05D 2270/80; F05D 2270/301; G01L 11/06; G01M 15/14
USPC .................... 73/112.01, 23.7, 23.29
See application file for complete search history.

(56) References Cited

U.S. PATENT DOCUMENTS

| | | | |
|---|---|---|---|
| 2010/0192694 A1* | 8/2010 | Hammerschmidt | ........................ B60C 23/0408 73/708 |
| 2011/0252884 A1* | 10/2011 | Hanscombe | .......... G01L 9/0008 73/32 A |
| 2013/0219902 A1* | 8/2013 | Harris | ..................... F01D 25/32 60/772 |
| 2014/0028020 A1* | 1/2014 | Langer | .................... F01D 17/08 285/353 |

FOREIGN PATENT DOCUMENTS

EP    2 631 437 A2    8/2013

OTHER PUBLICATIONS

Jul. 30, 2015 Great Britain Search Report issued in Great Britain Patent Application No. 1501764.3.

* cited by examiner

*Primary Examiner* — Jason D Shanske
*Assistant Examiner* — Maxime M Adjagbe
(74) *Attorney, Agent, or Firm* — Oliff PLC

(57) ABSTRACT

A pressure sensing apparatus is provided for sensing gas pressure at a pressure tapping. The apparatus has a pressure sensor which provides a pressure measurement signal in response to the pressure of a gas admitted into the sensor at a gas inlet port thereof. The apparatus further has a gas conduit which extends from the inlet port. An end of the conduit distal from the inlet port is adapted to receive the gas at the pressure tapping. The apparatus further has a condenser on the gas conduit. The condenser contains condensation surfaces on which humidity in the gas flowing from the pressure tapping to the inlet port condenses out. In operation the temperature at the condenser is lower than at the pressure tapping.

10 Claims, 3 Drawing Sheets

PRESSURE SENSING APPARATUS

FIELD OF THE INVENTION

The present invention relates to a pressure sensing apparatus, for example an apparatus for sensing pressure in a gas turbine engine.

BACKGROUND OF THE INVENTION

Gas turbine engines have pressure sensors for monitoring the pressure in the engine working gas at the various engine stages. The pressures are used, for example, for engine control and health monitoring.

A common form of sensor is a resonant cylinder sensor, in which the gas whose pressure is to be sensed is admitted into a cylinder-like structure having a resonant frequency. The internal pressure of the structure changes with the pressure of the sensed gas, producing a modulation in the resonant frequency which can be detected to determine the pressure. Such sensors can provide very stable readings over time.

As the gas is admitted directly into contact with the resonant structure, such sensors are generally provided with inlet filters to prevent the ingress of particulate matter.

The sensors may also have heating systems keeping them slightly hotter than ambient condition in order to discourage the formation of condensation which can affect the measurements through the presence of liquid and/or corrosion.

In aero engines, the sensors are typically located in benign environments (i.e. cool and low vibration) with tubes attached to their inlets which carry the pressure from pressure tappings at the engine locations where the pressure is to be measured. For example, the sensors can be placed within the Electronic Engine Controller (EEC).

However, a problem can arise when the working gas pressure increases with higher engine thrust. In such a situation, compressed air moves down the tube and, as it travels towards the sensor, cools down causing humidity in the air to condense within the tube. The condensation is not expelled when the engine thrust reduces and more condensate is captured every time the thrust is increased. A water trap can be located at the lowest point in the tube for the condensate to accumulate until emptied by a maintenance-fitter. However, even if the sensor is mounted with its gas inlet at its bottom to encourage condensate formed within the sensor to drain away from it, water and other liquid pollutants such as sulphuric acid can enter the sensor causing damage through corrosion and their presence can degrade the accuracy of readings.

Pressure sensors can be provided with flexible diaphragms to prevent water and pollutants from reaching the sensor. However, such diaphragms can only be used where limited changes in pressure are to be measured. They are unsuitable for use on aero engines, as the pressure changes may be from 1 to 30 atmospheres and the change in volume which they would need to accommodate is too large.

SUMMARY OF THE INVENTION

Accordingly, in a first aspect the present invention provides a pressure sensing apparatus for sensing gas pressure at a pressure tapping, the apparatus having:
 a pressure sensor which provides a pressure measurement signal in response to the pressure of a gas admitted into the sensor at a gas inlet port thereof;
 a gas conduit which extends from the inlet port, an end of the conduit distal from the inlet port being adapted to receive the gas at the pressure tapping; and
 a condenser on the gas conduit, the condenser containing condensation surfaces on which humidity in the gas flowing from the pressure tapping to the inlet port condenses out, in operation the temperature at the condenser being lower than at the pressure tapping.

In this way, although the gas leaving the condenser can be at 100% humidity, because the temperature at the condenser can be substantially less than at the tapping, the humidity of the gas entering the sensor may be significantly reduced, such that water and other liquid pollutants can be prevented from condensing in the sensor.

The pressure tapping can be a gas turbine engine pressure tapping, typically for receiving the working gas of the engine. Indeed, in a second aspect, the present invention provides a gas turbine engine having the pressure sensing apparatus according to the first aspect.

Optional features of the invention will now be set out. These are applicable singly or in any combination with any aspect of the invention.

The condenser may be adjacent the inlet port. This can help to reduce the amount of gas passing through the condenser, and thus can allow a smaller, more lightweight condenser to be installed.

The pressure sensor may be a resonant cylinder pressure sensor, although it may be of other type such as piezo crystal.

The pressure sensing apparatus may further have a condensate trap for the humidity condensed out by the condenser. For example, the condensate trap may be on the gas conduit between the condenser and the pressure tapping, the conduit extending downhill from the condenser to the trap.

Preferably, the condenser is arranged to operate at a lower temperature than the pressure sensor. In this way, the humidity of gas passing from the condenser to the sensor can be reduced by the increase in temperature. For example, the pressure sensor may have a heater to maintain an operational temperature of the sensor which is higher than that of the condenser. In an aero engine, the condenser should preferably be located at a position where the temperature does not exceed 50° C. The sensor may thus be heated to an operational temperature of at least 70 or 80° C. to maintain a temperature difference with the condenser that will lead to a substantial drop in humidity.

The pressure sensing apparatus may further have a thermal sensor to measure the temperature of the pressure sensor. The temperature measurement can be used for calibration of the sensor's pressure measurement, as well as for ensuring that the temperature of the sensor is higher than that of the condenser.

In order to encourage condensation, the condensation surfaces preferably provide a substantially increased surface area per unit length of the conduit. The condensation surfaces are typically formed of metal, or some other high thermal conductivity material, in order to ensure that heat generated by the condensation is quickly removed from the surfaces, thereby maintaining a low temperature at the condenser.

The condensation surfaces can be formed by a spiral wound coil, mesh, plates, tubes and/or a honeycomb structure. The condensation surfaces can be arranged, e.g. sloped, such that condensate formed thereon runs off, for example into the condensate trap. The condensation surfaces may be dimpled to act as turbulators of the gas. Dimples can also be used to set a minimum spacing between surfaces to prevent the condensate bridging the surfaces and thereby blocking the condenser.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
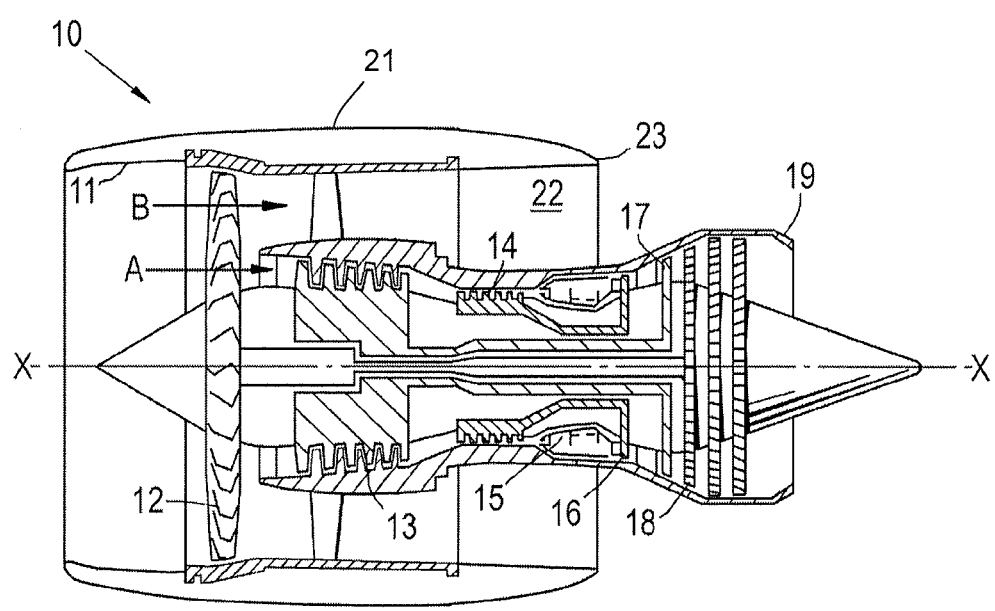
FIG. 1 shows a longitudinal cross-section through a turbo fan gas turbine engine.

With reference to FIG. 1, a turbo fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
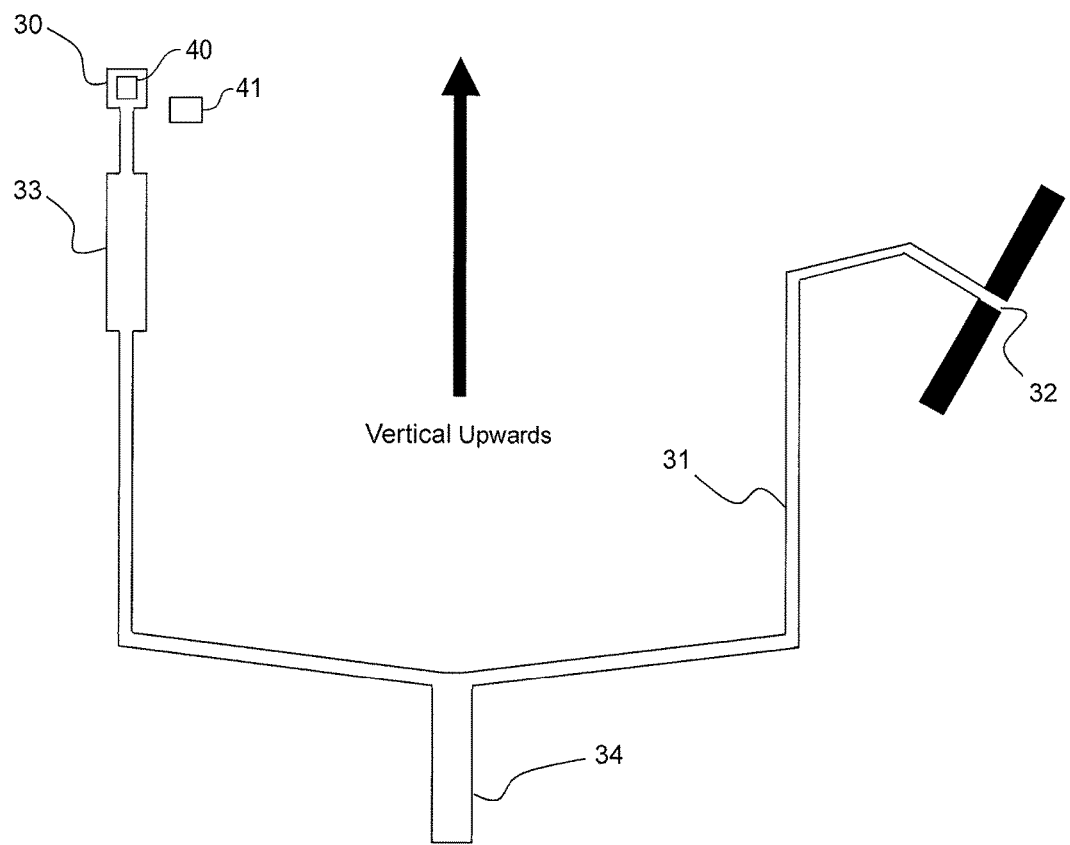
FIG. 2 shows schematically a pressure sensor apparatus of the engine of FIG. 1.

The engine 10 has an EEC containing a number of pressure sensors, e.g. of resonant cylinder type, for monitoring the pressure at different engine stages. Each sensor is part of an apparatus, shown schematically in FIG. 2, comprising the sensor 30, and a conduit 31 in the form of a tube which extends from the gas inlet of the sensor to a pressure tapping 32 in the engine. In use, the pressure of the working gas at the tapping is transmitted via the tube to the sensor. The pressure measured at the sensor by detection of changes in its resonant frequency can be calibrated in a manner known to the skilled person by a measurement of the temperature of the sensor and this change in resonant frequency. A condensate trap 34 can be fitted on the conduit 31 at a low point of the apparatus to accumulate not only water but also other condensates such as sulphuric acid.

A condenser 33 is located on the conduit 31 in an environment where the temperature preferably does not exceed 50° C. When the engine is accelerated and air flows into the conduit 31 through the pressure tapping 32 it is initially hot (through being compressed) and no condensation occurs. On cooling, the liquid vaporised in the gas condenses out, leaving the tube wet and the air at 100% humidity. On subsequent accelerations of the engine, this humid air is carried along the conduit 31. However, before arriving at the sensor 30 it passes through the condenser 33 where, on being cooled, its water and other liquid content is reduced by condensation onto the condensation surfaces of the condenser. The air leaving the condenser 33 to enter the sensor 30 is thus at a temperature of about 50° C. and has 100% humidity. However, as long as the sensor is above the condenser temperature, no moisture condenses onto the surfaces of the sensor. For example, the sensor can have a heater 40 which maintains the sensor at e.g. 85° C. and thereby reduces the humidity in the sensor to around 21%. Even if the sensor is, less preferably, at or close to the condenser temperature, the amount of condensation which forms inside the sensor can be substantially reduced by the condenser. In addition, a thermal sensor 41 can measure the temperature of the sensor 30.

Preferably, the condenser 33 is placed as close as possible to the inlet of the sensor 30 to minimise the amount of air passing through it and so reducing the size and weight it needs to condition that air.

The condensation surfaces of the condenser 33 can be oriented and configured such that condensed liquid drips from them and does not accumulate. If liquid forms bridges across the passages between condensation surfaces, upon exposure to freezing temperatures at high altitude, the condenser 33 can become blocked and the sensor 30 will stop working accurately. Thus, the condensation surfaces are preferably sufficiently far apart so that liquid droplets cannot bridge the passages. On vertical surfaces, approximately 2 mm gaps between surfaces can be sufficient to prevent liquid bridging and accumulation. The surfaces are preferably held vertically or at a sufficiently high angle so that liquid droplets can drain away from the condenser into the conduit 31 and from there to the water trap 34.

The condenser 33 may be formed from stainless steel for corrosion resistance and thermal conductivity. Conveniently, it can be shaped as a cylinder of about 10 cm length and 2 cm diameter with a sheet of e.g. 0.1 to 0.2 mm thick stainless steel coiled up inside. The sheet material can contain dimples with a height of about 2 mm to ensure that a sufficient spacing is maintained between turns of the coil and the wall of the tube. The dimples also act as turbulators to mix the gas boundary layer, thus encouraging heat transfer between the gas and the condensation surfaces and encouraging the formation of condensation on the surfaces.

Figure 3A:
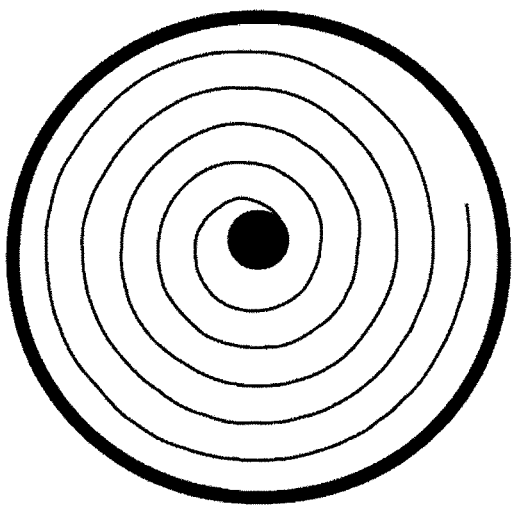
FIGS. 3A-3D shows schematically cross sections through cylindrical condensers containing condensation surfaces formed by (3a) a spiral wound sheet, (3b) tubes, (3c) flat plates, and (3d) a honeycomb structure.
Figure 3B:
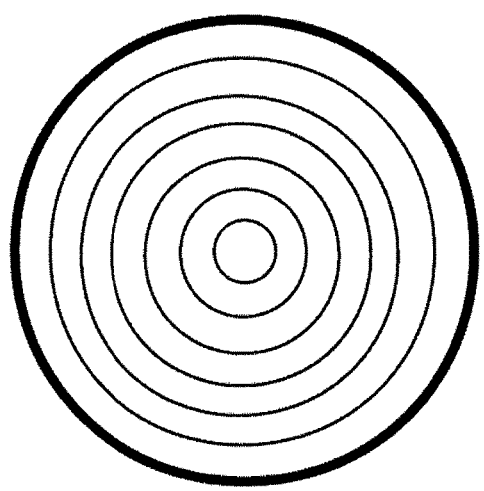
Figure 3C:
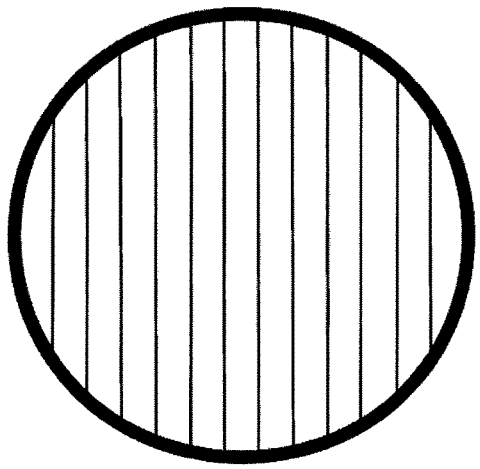
Figure 3D:
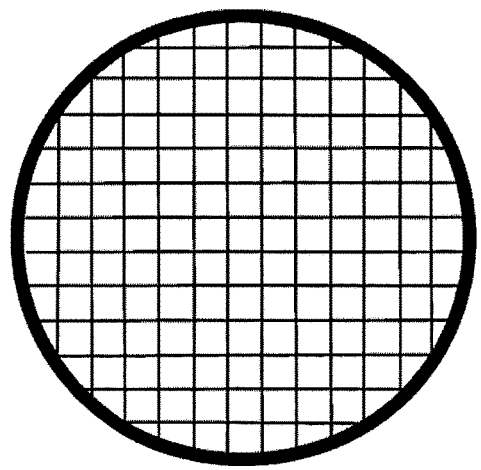

FIG. 3(a) shows schematically a cross section through a cylindrical condenser containing a sheet spiral wound around a central former. However, the condensation surface can be formed by other internal geometries, such as tubes (FIG. 3(b)), flat plates (FIG. 3(c)), a honeycomb structure (FIG. 3(d)) or meshes.

Advantageously, the condenser 33 can be a passive device with no moving parts. Further it can be inexpensive and light. The condenser can operate at high pressure-ratios, and is usable in systems that are usually non-flowing, i.e. having intermittent inward and outward pressure changes.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting.

Various changes to the described embodiments may be made without departing from the spirit and scope of the invention.

The invention claimed is:

1. A pressure sensing apparatus for sensing gas pressure at a pressure tapping, the apparatus having:
   a pressure sensor which provides a pressure measurement signal in response to the pressure of a gas admitted into the pressure sensor at a gas inlet port thereof;
   a gas conduit which extends from the inlet port, an end of the conduit distal from the inlet port being adapted to receive the gas at the pressure tapping; and
   a condenser on the gas conduit, the condenser containing condensation surfaces on which humidity in the gas flowing from the pressure tapping to the inlet port condenses out, in operation the temperature at the condenser being lower than at the pressure tapping,
   wherein the condenser is positioned between the pressure sensor and the pressure tapping such that the pressure sensor receives only the gas flowing from the condenser.

2. The pressure sensing apparatus according to claim 1, wherein the condenser is adjacent the inlet port.

3. The pressure sensing apparatus according to claim 1, wherein the pressure sensor is a resonant cylinder pressure sensor.

4. The pressure sensing apparatus according to claim 1, further having a condensate trap for the humidity condensed out by the condenser.

5. The pressure sensing apparatus according to claim 4, wherein the condensate trap is on the gas conduit between the condenser and the pressure tapping, the conduit extending downhill from the condenser to the condensate trap.

6. The pressure sensing apparatus according to claim 1, wherein the condenser is arranged to operate at a lower temperature than the pressure sensor.

7. The pressure sensing apparatus according to claim 6, wherein the pressure sensor has a heater to maintain an operational temperature of the pressure sensor which is higher than that of the condenser.

8. The pressure sensing apparatus according to claim 1, further having a thermal sensor to measure the temperature of the pressure sensor.

9. The pressure sensing apparatus according to claim 1, wherein the condensation surfaces are formed by a spiral wound coil, mesh, plates, tubes and/or a honeycomb structure.

10. A gas turbine engine having the pressure sensing apparatus according to claim 1.

* * * * *